Patented July 12, 1949

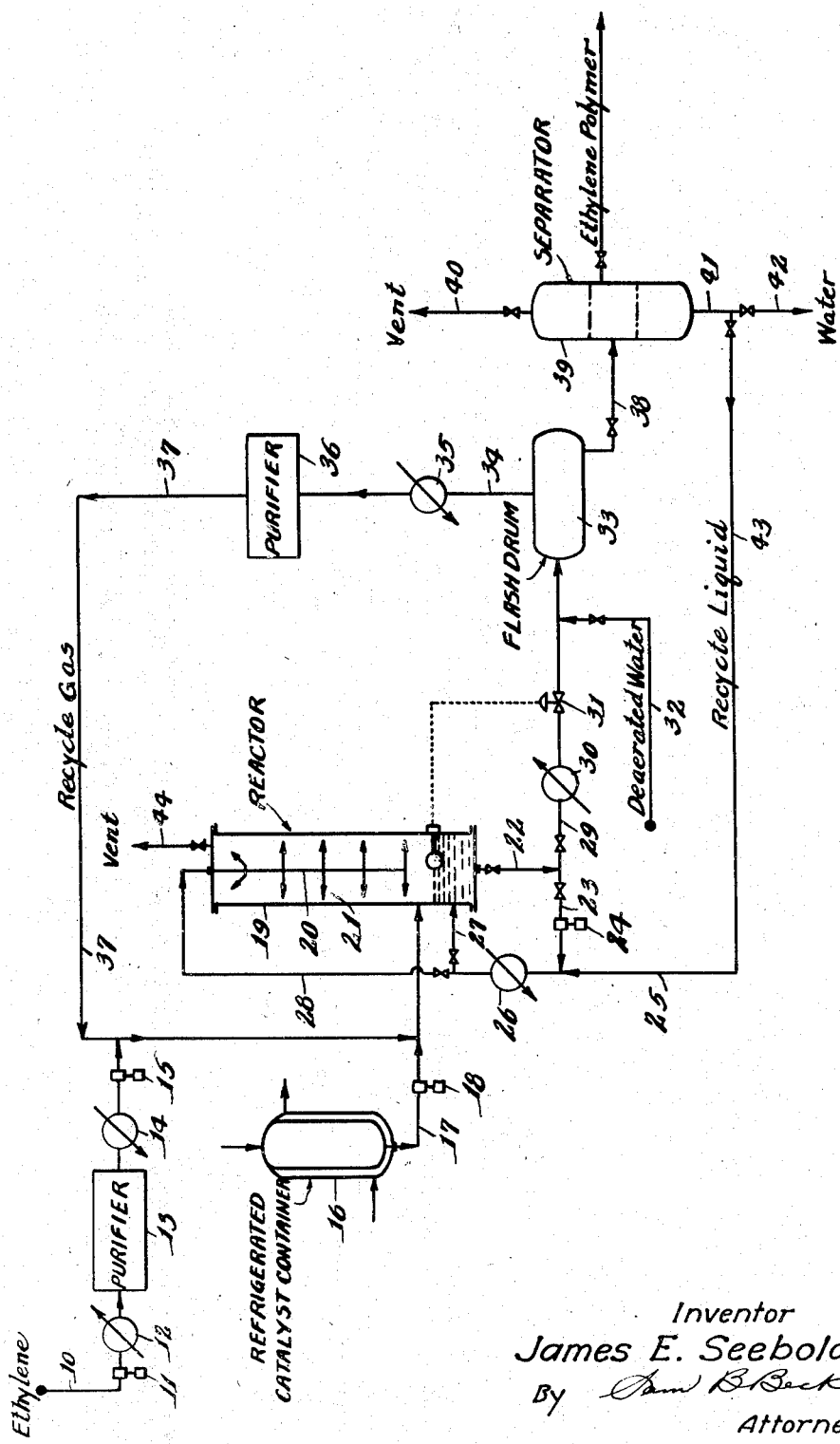

2,475,643

UNITED STATES PATENT OFFICE 2,475,643

ETHYLENE POLYMERIZATION PROCESS

James E. Seebold, Chicago, Ill., assignor to Standard Oil Company, Chicago, Ill., a corporation of Indiana Application December 31, 1946, Serial No. 719,527

9 Claims. (Cl. 260—94)

This invention relates to a process for the continuous polymerization of ethylene to form normally solid polymers. In one aspect, it relates to a process and apparatus for the continuous production of tough ethylene polymers having softening temperatures above about 100° C.

It has been proposed to polymerize emulsions of ethylene in aqueous liquids to produce normally solid ethylene polymers. However, it is difficult to secure emulsions having desirably high ethylene concentrations. Moreover, ethylene emulsions in aqueous liquids are inherently unstable and very considerable agitation is required to maintain ethylene emulsions even under high ethylene pressures. In addition, some of the catalysts for the polymerization of ethylene are insoluble or sparingly soluble in water, which gives rise to the problem of adequately contacting the ethylene contained in an aqueous emulsion with the catalyst in a uniform and rapid manner.

It has also been proposed to polymerize ethylene in solution in various solvents, as in U. S. Patent 2,334,195. Here, as in emulsion polymerization, it is difficult to procure ethylene solutions containing a desirably high concentration of ethylene. Also, when ethylene is polymerized in solution, the rate of ethylene polymerization is relatively unaffected by the pressure under which polymerization is conducted; this is extremely disadvantageous, and indicates rather strongly that the limiting factor in the rate of ethylene polymerization in solution is the relatively slow rate of dissolution of ethylene in the solvent. Moreover, as the data presented hereinafter will demonstrate, many solvents markedly inhibit the rate of ethylene polymerization in the presence of certain peroxide catalysts; in some instances, solvents appear to interact with the ethylene or ethylene polymers and may reduce the degree of polymerization.

This invention relates to a novel process whereby ethylene is polymerized in the gaseous state under the influence of a homongeneous catalyst to form normally solid polymers, the polymerization being conducted at a temperature below the softening temperature of the ethylene polymer being produced. It has been found that the use of polymerization temperatures below the softening point of the polymer prevents reduction in the yield of polymer and inhibits polymer degradation which may be encountered at polymerization temperatures above the softening point of polyethylene, which usually falls between about 75° C. and about 125° C., although it may be somewhat lower or higher.

Although the polymerization of ethylene in the gaseous state presents many advantages over ethylene polymerization from solutions or emulsions it is attended by a disadvantage which, if not overcome, practically prevents continuous operation. The gaseous phase ethylene polymerization process produces a polymer which forms a coating extending from the confining surfaces of the reaction zone toward the remaining gas phase; the effective volume of the polymerization reactor is progressively reduced over a relatively short period of time to such an extent that it becomes necessary to discontinue the polymerization process and to remove the polymer which is present in the reactor.

It is an object of this invention to provide a process for the polymerization of ethylene in the gaseous state under the influence of a homogeneous catalyst to produce a normally solid polymer and to prevent excessive accumulation of the resultant ethylene polymer in the reaction zone without interrupting the polymerization reaction. Another object of my invention is to provide apparatus for the practice of the aforesaid process. An additional object of this invention is to provide a process for the continuous gas phase polymerization of ethylene at a temperature below the softening temperature of the ethylene polymer being produced, in which process excessive accumulation of solid polymer in the polymerization reactor is prevented, without interrupting the polymerization reaction, by projecting an aqueous liquid stream along the confining interior surfaces of the polymerization zone with a force sufficient to prevent the accumulation of polymer on said surfaces. Another object of my invention is to remove the heat generated by ethylene polymerization by direct heat exchange with an aqueous liquid. These and other objects of my invention will become apparent from the ensuing description thereof.

In accordance with my invention, the accumulation of polymer in the reactor during the gas phase polymerization of ethylene with a homogeneous catalyst at a temperature below the softening point of the ethylene polymer is prevented by drenching the confining interior surfaces of the reactor with water or an aqueous liquid, thereby also dispersing the polymer in the liquid. The water or aqueous liquid serves the additional purpose of removing heat from the polymerization zone. Thus, the polymer can be removed readily from the polymerization zone, with the result that continuous polymerization may be practiced.

Although it might be thought that the nature of the liquid (hereinafter called the "carrier liquid") employed to remove the ethylene polymer from the reactor would be immaterial, the surprising fact is that different liquids exert remarkably different effects on the gas phase ethylene polymerization reaction, influencing the rate of polymerization, the degree of polymerization, or both. Water and aqueous solutions are superior carrier liquids, for it has been found that these liquids exert far smaller retardant influences on the ethylene polymerization reaction than do many other liquids.

The following table presents data indicating the course of ethylene polymerization in the absence of a carrier liquid and also in the presence of numerous carrier liquids. The catalyst employed in the tabulated trials was diethyl peroxydicarbonate, having the formula

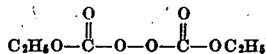

$$C_2H_5O-\overset{O}{\underset{\|}{C}}-O-O-\overset{O}{\underset{\|}{C}}-OC_2H_5$$

The experiments were performed in stainless steel (316) bombs having a capacity of about 220 ml. The diethyl peroxydicarbonate catalyst (0.5 ml.) was, in each instance, charged into the cold bomb which was then sealed, evacuated, flushed with ethylene and again evacuated. The carrier liquid was then charged into the evacuated bomb and then the ethylene was charged by condensing it under pressure into the cold bomb. Following a preliminary heating to the polymerization temperature of 55° C. the bombs were stationed vertically at this temperature in a water bath for 20 hours, which provided ample time for completion of the polymerization reactions. The ethylene employed in these runs was substantially free of oxygen (about 10 parts per million or less) having been pretreated by contacting under pressure with molten sodium at about 150° C. Molecular oxygen exerts a remarkable retardant effect upon peroxide polymerization catalysts such as peroxydicarbonate esters, such that commercial cylinder ethylene containing in the neighborhood of 0.05 weight percent of molecular oxygen is unsuitable as a feed stock for the present polymerization process.

Table

| Run No. | Weight of Ethylene, Grams | Carrier Liquid | Quantity of Carrier Liquid | Available O₂ in the Catalyst [1] | Maximum Pressure | Wt. of Product | Wt. Conversion | Softening Point of Polyethylene |
|---|---|---|---|---|---|---|---|---|
| | | | | Per cent | P. s. i. g. | Grams | Per cent | ° C. |
| 1 | 60 | None | | 17.1 | 1,500 | 6.0 | 10.0 | 103 |
| 2 | 60 | do | | 17.1 | 3,200 | 18.9 | 31.5 | 107 |
| 3 | 60 | do | | 17.1 | 5,000 | 25.0 | 41.7 | 108 |
| 4 | 52 | Pentane (distilled) | 10 ml | 16.9 | 1,300 | 3.4 | 6.5 | 91 |
| 5 | 60 | do | 10 ml | 16.9 | 5,000 | 3.3 | 5.5 | 99 |
| 6 | 57 | Methylcyclohexane | 10 ml | 17.1 | 1,900 | 4.2 | 7.4 | 96 |
| 7 | 60 | do | 10 ml | 17.1 | 4,900 | 3.5 | 5.8 | 101 |
| 8 | 50 | Benzene | 10 ml | 17.4 | 1,400 | 4.4 | 8.8 | 104 |
| 9 | 60 | do | 10 ml | 17.4 | 4,400 | 6.4 | 10.7 | 98 |
| 10 | 60 | Xylene (distilled) | 10 ml | 17.4 | 1,500 | 2.3 | 3.8 | 95 |
| 11 | 60 | do | 10 ml | 17.4 | 4,900 | 2.2 | 3.7 | 108 |
| 12 | 60 | Methanol | 10 ml | 17.3 | 1,700 | 0.8 | 1.3 | 103 |
| 13 | 60 | do | 10 ml | 17.3 | 5,000 | 0.3 | 0.5 | 126 |
| 14 | 60 | Diethyl Ether | 10 ml | 17.2 | 1,950 | 4.7 | 7.8 | 104 |
| 15 | 60 | do | 10 ml | 17.2 | 4,900 | 3.3 | 5.5 | 109 |
| 16 | 60 | Nitrobenzene | 10 ml | 16.5 | 1,475 | 10.9 | | Liquid |
| 17 | 43 | do | 10 ml | 16.5 | 4,600 | 10.3 | | Liquid |
| 18 | 60 | Nitroethane | 10 ml | 17.3 | 1,500 | 0.7 | 1.2 | Gel |
| 19 | 60 | do | 10 ml | 17.3 | 4,800 | 0.4 | 0.7 | 107 |
| 20 | 57 | Carbon disulfide | 10 ml | 16.7 | 1,400 | 1.1 | 1.8 | 75 |
| 21 | 54 | do | 10 ml | 16.7 | 4,500 | 1.6 | 2.7 | 78 |
| 22 | 60 | C₂H₅Cl | 13 g | 17.4 | 1,500 | 9.7 | 16.2 | 89 |
| 23 | 57 | do | 10 g | 17.4 | 4,800 | 7.4 | 13.0 | 107 |
| 24 | 52 | do | 25 g | 16.9 | 5,000 | 6.1 | 11.7 | 98 |
| 25 | 60 | n-Butyl Chloride | 10 ml | 17.1 | 1,800 | 4.9 | 8.2 | 93 |
| 26 | 60 | do | 10 ml | 17.1 | 4,800 | 4.9 | 8.2 | 101 |
| 27 | 60 | Chloroform | 10 ml | 17.4 | 1,850 | 1.1 | 1.8 | Gel |
| 28 | 60 | do | 10 ml | 17.4 | 4,800 | 0.9 | 1.5 | Gel |
| 29 | 60 | Chloroform (distilled) | 10 ml | 17.3 | 4,600 | 11.3 | 18.8 | 48 |
| 30 | 46 | CCl₄ | 10 ml | | 1,325 | 1.6 | 3.5 | |
| 31 | 58 | do | 10 ml | | 4,700 | 1.5 | 2.6 | 81 |
| 32 | 52 | Dichloroethylene | 10 ml | 17.2 | 1,400 | 4.6 | 7.8 | 64 |
| 33 | 60 | do | 10 ml | 17.2 | 4,500 | 5.3 | 8.9 | 98 |
| 34 | 60 | Ethylene trichloride | 10 ml | 16.6 | 4,400 | 13.7 | 22.8 | 73 |
| 35 | 60 | Water | 10 ml | 16.7 | 1,400 | 2.4 | 4.0 | 74 |
| 36 | 60 | do | 50 ml | 17.2 | 1,900 | 4.1 | 6.8 | 97 |
| 37 | 60 | do | 50 ml | 17.2 | 2,300 | 7.2 | 12.0 | 99 |
| 38 | 52 | do | 10 ml | 16.7 | 4,500 | 15.1 | 29.1 | 109 |
| 39 | 54 | do | 10 ml | 16.7 | 4,500 | 17.4 | 32.1 | 105 |

[1] The theoretical peroxide content of the catalyst is 17.9%.

The data obtained in runs 1 to 3 indicate that when no liquid is present in the reactor, the ethylene polymerization reaction uniformly produces a product having a softening point above about 100° C. even at the relatively low pressure of 1500 p. s. i., and further indicate that the pressure coefficient of the reaction is high. By "pressure coefficient" of the polymerization reaction is meant the ratio of the percentage conversion at a high pressure (about 4500–5000 p. s. i. g.) to the percentage conversion at a low pressure (about 1300–2000 p. s. i. g.). When solvents other than water were used, the pressure coefficient of the polymerization reaction was a fractional value or a small integral value. When the polymerization reaction was effected in the presence of water, the reaction exhibited a high integral pressure coefficient. The data in the table indicate that most liquids exert a rather marked inhibitive effect on the course of the polymerization reaction; this can readily be noted, for example, by comparing the conversions in runs 5, 7, 9, 11, etc., wherein various liquids were present at a polymerization pressure of about 5000 p. s. i. g. with the conversion figure tabulated for run 3, wherein no liquid was employed. As the data show, water exerts by far the slightest inhibitive effect on the polymerization reaction, both as to the rate of polymerization and the degree of polymerization.

It has been pointed out (supra) that molecular oxygen exerts a definite inhibitive effect on the ethylene polymerization process; this point of view tends to be borne out by comparison of run 28 with run 29 wherein the sole significant variable was the fact that in the latter run the chloroform was freshly distilled before use so that it contained no significant amount of absorbed oxygen.

The tabulated runs also indicate that the presence of some liquids markedly reduces the degree of polymerization and some liquids even appear to interact with ethylene or the ethylene polymers being formed in the polymerization zone. For example, it will be noted than in the runs with nitrobenzene and nitroethane (runs 16-18) liquid or gel-like products were obtained and that in the runs with chloroform (runs 27-29) gel-like products were also obtained. Review of the tabulated data indicates that polymers having low softening points are produced in numerous instances when the reaction is effected in the presence of various organic liquids.

Reference will not be made to the accompanying figure which illustrates one embodiment of the present invention. The ethylene charging stock can be prepared by a variety of methods known in the art. Thus, ethylene may be obtained from petroleum refinery gas streams, e. g. streams derived from thermal or catalytic cracking processes, from high temperature cracking of propane, by catalytic dehydrogenation of ethane, by treatment of ethane-oxygen mixtures at high temperatures, by catalytic dehydration of ethanol and the like. The ethylene stream subjected to polymerization should be substantially free of oxygen and sulfur or their compounds, and free of nitrogen compounds. I prefer to employ ethylene charging stocks containing 10 parts (by weight) per million of molecular oxygen or less, no sulfur or nitrogen compounds, and containing at most only small proportions of higher olefins such as propylene or butylenes, and acetylene. Propylene concentrations of the order of about 0.5 weight percent in the ethylene charging stock can be tolerated when the ethylene is to be polymerized to polyethylenes have a softening point above about 100° C., but it has been observed that higher concentrations of propylene, for example, about 5 percent, or more in the ethylene charging stock, markedly reduce the softening point of the polymer which is produced by the process of the present invention. Propylene and higher olefins may be selectively removed from ethylene by adsorption, polymerization, alkylation, etc.

The charging stock employed in the process of this invention may comprise saturated hydrocarbons such as ethane and propane, which merely exert a diluent effect by reducing the amount of ethylene in the polymerization zone, but do not exert any poisoning effect on the polymerization reaction.

As illustrated, ethylene is passed from source 10 through a pump or compressor 11 and heater 12 into a purifier indicated schematically at 13. In zone 13, oxygen, and nitrogen and sulfur-containing materials are removed from the ethylene stream. Prior art processes for the removal of small amounts of oxygen from hydrocarbon gas streams may be employed for the purpose of deoxidizing the ethylene charging stock. By way of example the ethylene may be deoxidized after being compressed to 750 p. s. i. g. and heated to about 300° F. by passage through a column packed with grains of metallic copper. An alternative method of deoxidizing comprises contacting the ethylene, under desired pressure, with an alkali metal or an alkaline earth metal, for example, molten sodium or a sodium-potassium alloy. The oxygen content of ethylene is readily reduced below 10 parts per million by contacting it with sodium-potassium alloys at temperatures of about 125° C. to about 150° C. over a period of about 2 to about 12 hours. Other suitable methods of oxygen removal are described in British Patent No. 560,497. It may be desirable to remove oxygen and sulfur compounds from ethylene by different methods in separate zones.

From purifier 13, the ethylene charging stock is passed into a heat exhanger 14 wherein its temperature is brought to about the temperature which it is desired to maintain in the polymerization reactor 19. Next, the ethylene is compressed by compressor 15 to the desired polymerization pressure and is joined by catalyst forced from a refrigerated vessel 16 through valved line 17 by pump 18. If desired, the catalyst and ethylene streams may be separately injected into the reactor. Catalyst may be added to the reactor as such or as a dispersion or solution in water. Highly frangible catalysts such as peroxydicarbonate esters can be injected into the reactor as a stream separate from the ethylene stream, at a low temperature, which may be 0° C. or even less.

In reactor 19, ethylene is polymerized in the gaseous phase under the influence of a homogeneous catalyst. The resultant polymer which tends to coat the reactor walls is removed by sprays of water or an aqueous liquid. The carrier liquid can be introduced into the polymerization reactor through a centrally located vertical manifold 20 bearing spray heads 21. Stationary or rotating (reaction) spray heads may be employed. Tangential injection of the carrier liquid at various levels in the reactor may also be used. The carrier liquid is sprayed against the confining interior surfaces of the polymerization reactor under sufficient pressure to prevent undue accumulation of solid ethylene polymer in the reactor. Under some reaction conditions and in some polymerization reactors, the rate of accumulation of ethylene polymer may not be such as to justify the continuous introduction of the carrier liquid, and intermittent introduction of carrier liquid may serve to prevent the undue accumulation of polymer in the reactor.

The carrier liquid carries the ethylene polymer into a sump in the lower portion of the reactor.

The dispersion of ethylene polymer in water or aqueous liquid in the bottom of the reactor, which dispersion may be maintained by a mechanical mixing device (not shown), or by recirculating a water stream, leaves the reactor by line 22.

Although a vertical reactor has been diagrammatically illustrated other forms of reactor may be employed. Thus, a reactor of the type shown may be employed in an inclined position. If desired, the polymerization reactor may be rotated mechanically to aid in the distribution of the carrier liquid along the interior walls of the reactor. It is desirable to employ reactors having a large surface:volume ratio to facilitate rapid dissipation of the heat evolved during the polymerization of the ethylene. The reactor can be made of stainless steel and can be lined with glass, silver, nickel, tin, aluminum and its alloys, etc.

A portion of the slurry leaving reactor 19 through valved line 22 may be passed into valved line 23 whence it is forced by pump 24 into line 25 and through cooler 26. From cooler 26 the slurry may be passed in part through valved line 27 to the sump of the reactor and in part through valved line 28 for recirculation through the manifold 26. All or part of the slurry leaving the reactor 19 through valved line 22 can be passed through valved line 29 to heater 30 wherein the temperature of the slurry is elevated above the softening point of the ethylene polymer contained therein. From heater 30 the reaction mixture passes through pressure reducing valve 31, whose operation is controlled by the liquid level of the slurry in reactor 19 by the use of known means. Additional carrier liquid may be added to the reaction mixture after it has passed through valve 31 by means of line 32. For example deaerated water prepared by condensing open steam may be passed through line 32. The reaction products next pass to a flash drum 33 from which a recycle gas stream is vented through line 34 whence it is passed through heat exchanger 35 to a purification zone 36 in which oxygen and carbon dioxide contained in the recycle stream as a consequence of catalyst decomposition are recovered by conventional methods. Thus, carbon dioxide can be removed from the recycle ethylene stream by absorption in alkalies or both oxygen and carbon dioxide can be removed by molten alkali metals. Oxygen removal from the ethylene may be carried out as in purifier 13. The purified recycle stream is passed through line 37 to join fresh feed passing through line 15.

Suitable operating conditions in the flash drum are a pressure of about 25 to 50 p. s. i. g. and temperatures of about 200 to 300° F., e. g., about 250° F. Liquid is withdrawn from the lower portion of the flash drum by valved line 38 and passes into separator 39. Any gases which separate in drum 39 may be removed therefrom through valved vent line 40. By suitable control of the temperature in separator 39 the liquid therein separates into two liquid layers, viz., a supernatant layer of molten ethylene polymer and a lower layer of water or aqueous carrier liquid. The lower liquid stratum is withdrawn from separator 39 through line 41 whence part thereof may be discharged from the system through valved line 42, but is preferably recycled through valved line 43 and lines 25 and 26 to manifold 20 in reactor 19. The molten ethylene polymer is discharged from separator 39 through valved line 44.

Reactor 19 is provided with vent line 44; the vent gases can be compressed and recycled to reactor 19 directly or after purification in purifiers 13 or 36.

Preferred catalysts for use in the practice of the gas phase polymerization of ethylene to normally solid polyethylenes are the peroxydicarbonate esters, which have the general formula

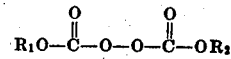

wherein $R_1$ and $R_2$ are organic radicals. These are extremely active and frangible peroxides, which possess the unusual property of inducing ethylene polymerization at a desirable rate at temperatures below about 100° C. to yield solid polymers having softening temperatures above about 100° C. and ranging in properties from waxy to hard, horny, resinous materials. A suitable method for the preparation of these catalysts comprises suspending the desired ester of chloroformic acid,

in an aqueous or non-aqueous medium, for example, water, chloroform, pentane, etc. and treating this suspension with a peroxide, usually sodium peroxide, at a low temperature, e. g., 0° C. Suitable methods for the preparation of dialkyl peroxydicarbonates have been described by Wieland, et al., Annalen 446, 31–48 (1926). However, I do not limit myself to the Wieland methods of preparing peroxydicarbonates, and other methods can be used for the purpose of this invention. Crude peroxydicarbonates can be used, but it is preferable to employ a purified peroxide such as may be obtained by selective extraction of the crude peroxide. Also, purification may be accomplished by selective extraction of impurities from the peroxydicarbonate ester.

In the general formula

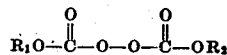

the organic radicals $R_1$ and $R_2$ can be the same or different and may, for example, be alkyl radicals such as methyl, ethyl, propyl, butyl, amyl; radicals containing an aromatic nucleus such as benzyl, phenyl, tolyl; cycloparaffinic radicals such as cyclopentyl, methylcyclopentyl, cyclohexyl; unsaturated radicals, such as vinyl, allyl, propenyl; or their substitution derivatives or the like. I may also use peroxydicarbonate esters wherein $R_1$ and $R_2$ make up a divalent radical. I may also employ polymeric peroxides, e. g., of the type which can be produced by the reaction between sodium peroxide and ethylene glycol bis (chloroformate).

It should not be inferred that all the peroxydicarbonate esters have precisely equivalent capacity for catalyzing the polymerization of ethylene to form normally solid polymers, although no significant decrease in catalytic activity has been observed as the substituted group in the catalyst was changed from methyl to ethyl, butyl, propyl and amyl.

Peroxydicarbonate esters are generally thermally unstable and exhibit a high temperature coefficient of decomposition. A number of the peroxides, e. g. dimethyl, diethyl and dipropyl peroxydicarbonates, are characterized by being 10% decomposed in one second at a first temperature and at least 90% decomposed in one second at another temperature which is less than 35° C. higher than said first temperature. Diethyl peroxydicarbonate decomposes completely and substantially instantaneously at about 35° C. At higher temperatures diethyl peroxydicarbonate decomposes with explosive violence. Nonetheless, I can employ diethyl peroxydicarbonate as a polymerization catalyst for the preparation of solid polymers from ethylene at temperatures above its decomposition temperature, e. g., 55° C. or 65° C. It appears that the thermal stability of peroxydicarbonate ester catalysts is increased by the presence of unsaturated organic compounds or their polymers. Peroxides other than peroxydicarbonate esters may be useful as polymerization catalysts provided that at temperatures within the polymerization temperature range they exhibit the pronounced temperature coefficient of decomposition which characterizes the peroxydicarbonate esters.

Although the peroxydicarbonate esters are the preferred catalysts for the operation of the polymerization process of this invention, the use of other catalysts, alone or together with the peroxydicarbonate esters is not excluded. For example, tert. butylhydroperoxide may be employed as a catalyst.

Normally between about 0.01 and about 10 percent by weight of peroxide based on the weight of ethylene or related compound to be polymerized is employed, although some departure from this range may be necessary in certain instances. It is preferable that the actual oxygen content of the peroxide which is employed fall within the range of 80 to 100 per cent of the theoretical oxygen content of said peroxide. We have found that some of the peroxydicarbonate esters, for example diethyl peroxydicarbonate, decompose on standing and that the aged catalysts are not as active polymerization catalysts as freshly made preparations. Generally, an increase in the proportion of catalyst to feed stock increases the rate of polymerization, other reaction conditions remaining the same. However, excessive amounts of catalyst may result in the production of polymers of lower molecular weight than might otherwise be obtained.

The gas phase polymerization of ethylene may be conducted at temperatures between about 0° C. and about 100° C. At temperatures below about 0° C. the rate of ethylene polymerization is so slow as to be commercially unattractive; at temperatures which, depending on the specific catalyst employed, may vary from about 75° C. to about 100° C., the yield and degree of polymerization of polymer are markedly reduced. A preferred polymerization temperature range to produce polyethylenes having softening temperatures of at least about 100° C. lies between about 35° C. and about 65° C., especially where peroxydicarbonate ester catalysts, for example diethyl peroxydicarbonate, are employed.

The polymerization pressure, by which is meant the partial pressure of ethylene in the polymerization zone, may vary between about 500 and about 10,000 p. s. i. g. or even more. Homogeneous gas phase polymerization of ethylene with catalysts such as peroxydicarbonate esters is best effected at pressures above about 4,000 p. s. i. g. and preferably not in excess of about 10,000 p. s. i. g. At polymerization pressures up to about 5,000 p. s. i. g. the rate of ethylene polymerization increases with increasing pressure. However, above about 5,000 p. s. i. g. the rate of ethylene polymerization does not appear to increase markedly with pressure, although the softening temperatures of the ethylene polymers continue to increase, with the result that at pressures of about 8,000 p. s. i. g. it has been possible to produce polyethylenes having softening temperatures above about 200° C.

Depending upon the other reaction variables and upon the nature of the product desired, the polymerization period may vary from less than about 1 to about 50 hours or even more, e. g., 100 hours. Ordinarily polymerization periods of between about 1 and about 5 hours are satisfactory.

The polyethylenes produced by the process of this invention can be subjected to such after-treatment as may be desired, to fit them for particular uses or to impart desired properties. Thus, the polyethylenes can be extruded, mechanically milled, or cast. Antioxidants, fillers, extenders, plasticizers, pigments, etc. can be incorporated in the polyethylenes.

Although the process of my invention will probably find its widest application in processes for the continuous polymerization of ethylene, it is not limited in its usefulness to continuous processes. Thus, the intermittent or continuous use of a carrier liquid may be desirable in effecting the polymerization of ethylene in large batch reactors.

Having thus described my invention, what I claim is:

1. A process which comprises continuously passing a gas stream comprising ethylene as the sole polymerizable component and a catalyst having the general formula

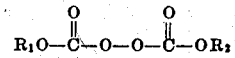

wherein $R_1$ and $R_2$ are alkyl radicals through a reaction zone, continuously polymerizing the ethylene in said gas stream to form a polymer having a softening temperature above about 100° C. at a polymerization temperature between about 0° C. and about 100° C. at a pressure between about 4,000 and about 10,000 p. s. i. g., maintaining a moving film of water upon the confining interior surfaces of said reaction zone, withdrawing a dispersion of ethylene polymer in water from said reaction zone, separating a water stream from the ethylene polymer, cooling said stream and recycling said cooled stream to said reaction zone.

2. The process of claim 1 wherein the catalyst is diethylperoxydicarbonate.

3. A process for the homopolymerization of ethylene which comprises polymerizing a gas stream containing ethylene as the sole polymerizable component and between about 0.01 and about 10 per cent by weight, based on said ethylene, of a catalyst having the general formula

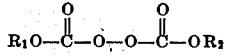

wherein $R_1$ and $R_2$ are hydrocarbon radicals at a temperature between about 0° C. and about 100° C. and a polymerization pressure between about 1400 p. s. i. g. and about 10,000 p. s. i. g. in a reaction zone, maintaining a moving liquid film consisting of water upon the confining interior surfaces of said reaction zone, effecting polymerization of ethylene without substantial agitation of said gas stream into said liquid film, and removing ethylene polymer from said reaction zone as a dispersion thereof in said liquid.

4. The process of claim 3 wherein said polymerization pressure is between about 4,000 and about 10,000 p. s. i. g.

5. The process of claim 3 wherein $R_1$ and $R_2$ are alkyl radicals and the polymerization pressure is between about 4,000 and about 10,000 p. s. i. g.

6. The process of claim 3 wherein $R_1$ and $R_2$ are alkyl radicals, the temperature is between about 35° C. and about 65° C. and the polymerization pressure is between about 4,000 and about 10,000 p. s. i. g.

7. The process of claim 3 wherein the polymerization catalyst is diethylperoxydicarbonate and the polymerization pressure is between about 4,000 and about 10,000 p. s. i. g.

8. The process of claim 3 wherein the polymerization catalyst is diethylperoxydicarbonate, the temperature is between about 35° C. and about 65° C. and the polymerization pressure is between about 4,000 and about 10,000 p. s. i. g.

9. A process for the homopolymerization of ethylene which comprises polymerizing a gas stream containing ethylene as the sole polymerizable component and between about 0.01 and about 10 percent by weight, based on said ethylene, of a di-peroxydicarbonate ester at a temperature between about 0° C. and about 100° C. and a polymerization pressure between about 1400 p. s. i. g. and about 10,000 p. s. i. g. in a reaction zone, maintaining a moving liquid film consisting of water upon the confining interior surfaces of said reaction zone, effecting polymerization of ethylene without substantial agitation of said gas stream into said liquid film, and removing ethylene polymer from said reaction zone as a dispersion thereof in said liquid.

JAMES E. SEEBOLD.

REFERENCES CITED

The following references are of record in the file of this patent:

UNITED STATES PATENTS

| Number | Name | Date |
|---|---|---|
| Re. 22,210 | De Simo | Oct. 27, 1942 |
| 2,370,588 | Strain | Feb. 27, 1945 |
| 2,396,920 | Larson | Mar. 19, 1946 |